United States Patent
Li (10) Patent No.: US 8,644,715 B2
(45) Date of Patent: Feb. 4, 2014

(54) METHOD AND DEVICE FOR MONITORING AND CONTROLLING PHASE DIFFERENCE BASED ON DQPSK MODULATION

(75) Inventor: Gong Li, Shenzhen (CN)

(73) Assignee: ZTE Corporation, Shenzhen, Guangdong Province P.R. (CN)

( * ) Notice: Subject to any disclaimer, the term of this patent is extended or adjusted under 35 U.S.C. 154(b) by 97 days.

(21) Appl. No.: 13/503,765

(22) PCT Filed: Jun. 9, 2010

(86) PCT No.: PCT/CN2010/073739
§ 371 (c)(1),
(2), (4) Date: Apr. 24, 2012

(87) PCT Pub. No.: WO2010/145488
PCT Pub. Date: Dec. 23, 2010

(65) Prior Publication Data
US 2012/0230677 A1 Sep. 13, 2012

(30) Foreign Application Priority Data
Oct. 27, 2009 (CN) .......................... 2009 1 0210132

(51) Int. Cl.
*H04B 10/06* (2011.01)
(52) U.S. Cl.
USPC ............................ 398/209; 398/208; 398/202
(58) Field of Classification Search
None
See application file for complete search history.

(56) References Cited

U.S. PATENT DOCUMENTS

| 7,676,162 | B2 * | 3/2010 | Isomura et al. | 398/212 |
| 7,877,025 | B2 * | 1/2011 | Tao et al. | 398/209 |
| 7,991,301 | B2 * | 8/2011 | Mizuguchi et al. | 398/208 |
| 8,078,067 | B2 * | 12/2011 | Sasaki | 398/212 |
| 8,145,072 | B2 * | 3/2012 | Akiyama et al. | 398/213 |
| 2007/0292140 | A1 * | 12/2007 | Terayama et al. | 398/140 |
| 2008/0137778 | A1 | 6/2008 | Makimoto et al. | |
| 2009/0257756 | A1 * | 10/2009 | Fukumitsu | 398/202 |

FOREIGN PATENT DOCUMENTS

| CN | 1893324 A | 1/2007 |
| CN | 101692624 A | 4/2010 |
| EP | 1868305 A1 | 12/2007 |

OTHER PUBLICATIONS

International Search Report for PCT/CN2010/073739 dated Aug. 12, 2010.

\* cited by examiner

*Primary Examiner* — Shi K Li
*Assistant Examiner* — Merlin Brito Peguero
(74) *Attorney, Agent, or Firm* — Ling Wu; Stephen Yang; Ling and Yang Intellectual Property (57) ABSTRACT

A method and a device for monitoring and controlling a phase difference based on DQPSK modulation are provided, and the method includes: performing the $n^{th}$ power multiplication operation respectively on a first differential current signal and a second differential current signal output after DQPSK demodulation to correspondingly obtain a first monitor signal and a second monitor signal, where n is a positive integral multiple of 4; monitoring phase differences between respectively two arms of a first demodulator according to the first monitor signal and two arms of a second demodulator according to the second monitor signal; adjusting the phase differences between respectively two arms of the first demodulator and two arms of the second demodulator using the monitor result, so that the differences can meet demodulation requirements and a receiver can obtain transmitted information.

12 Claims, 3 Drawing Sheets

METHOD AND DEVICE FOR MONITORING AND CONTROLLING PHASE DIFFERENCE BASED ON DQPSK MODULATION

TECHNICAL FIELD

The present invention relates to the optical communication field, especially the optical demodulation technology, and specifically to a method and a device for monitoring and controlling a phase difference based on (Differential Quadrature Phase Shift Keying) DQPSK modulation.

BACKGROUND ART

The optical communication system has rapidly grown during the past several years, the global 40 G transmission commercialization process has an obvious acceleration trend, and scale-deployment was started. The acceleration of the commercialization process also spurs the development of industrial chain. Compared with the 10 G transmission system, the 40 G transmission system, under the same physical conditions, requires that the OSNR (Optical Signal Noise Ratio) be increased by four multiples (6 dB), the chromatic dispersion tolerance be decreased by 16 multiples and the PMD (Polarization Mode Dispersion) tolerance be decreased by four multiples, and non-linear effect also becomes more obvious. In order to overcome these limitations to meet the commercial requirements, many measures should be taken, among which modulation and coding technique is the most crucial one. A practical modulation technique is not only limited to the conventional NRZ (No Return Zero) or RZ (Return Zero) binary amplitude shift keying (OOK, on-off key), and many new modulation techniques, for example, DPSK (Differential Phase Shift Keying) modulation, DQPSK (Differential Quadrature Reference Phase Shift Keying) modulation and so on, are used in the optical communication, and especially the DQPSK modulation, which reduces the requirements on the rate, the chromatic dispersion and the polarization mode dispersion of the electrical element, plays an important role in the 40 G optical communication system.

The principle of DQPSK modulation is that because an optical carrier can be expressed as $E_i = E \exp j[\omega_0 t + \phi(t)]$, where E is the field strength, $\omega_j$ is the angular frequency of the optical carrier, $\phi(t)$ is the modulated phase. DQPSK modulation is to code the information to be transmitted into the differential phase of continuous optical bits. The differential phase is indicated by $\Delta\omega$, which may be a value among $[0, \pi/2, \pi, 3\pi/2]$. It is assumed that the phase of the k$-1^{th}$ optical bit pulse is $\theta(k-1)$. If the subsequent bits are 0, 0, then $\theta(k)=\theta(k-1)+\pi$, if the subsequent bits are 0, 1, then $\theta(k)=\theta(k-1)+\pi/2$; if the subsequent bits are 1, 1, then $\theta(k)=\theta(k-1)$; if the subsequent bits are 1, 0, then $\theta(k)=\theta(k-1)+3\pi/2$. Of course, the above rule for coding the information to be transmitted with $\Delta\phi$ is not limited to the above mode, for example, it may be that when the subsequent bits are 0, 0, $\theta(k)=\theta(k-1)$, and if they are 1, 1, then $\theta(k)=\theta(k-1)+\pi$, and so on.

Figure 1:
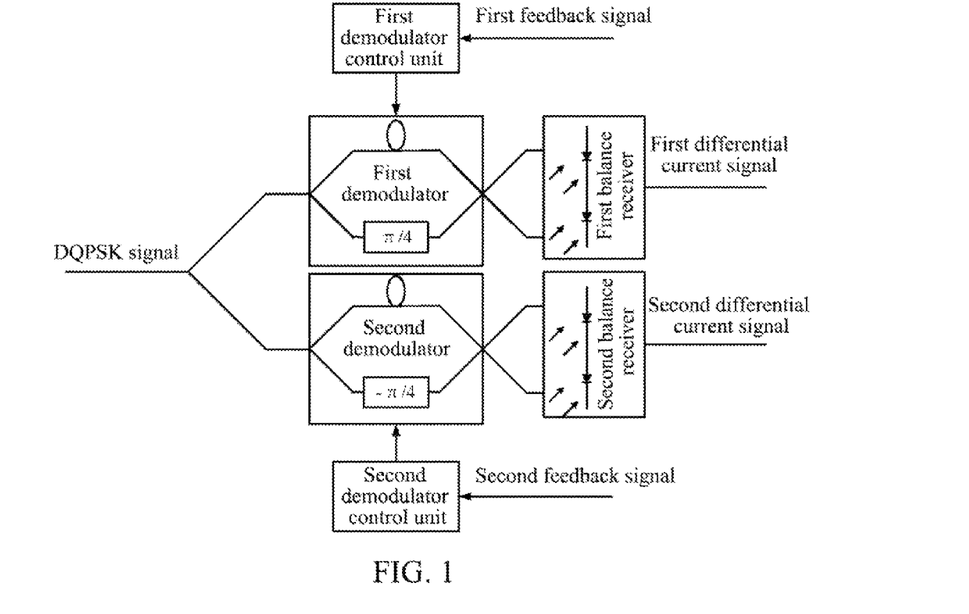
FIG. 1 is the existing block diagram of the receiver based on DQPSK modulation.

The DQPSK demodulation principle based on the above DQPSK modulation process is that two differential currents are obtained by performing DQPSK demodulation on the received optical signal, these two differential currents carry the modulation phase difference between adjacent optical bits, and the transmitted information is obtained according to the modulation phase difference. FIG. 1 is the block diagram of the existing receiver based on DQPSK modulation. As shown in FIG. 1, the receiver comprises a first demodulator, which is used to perform phase rise and phase cancellation operations on the optical signal transmitted by its two arms and output a first phase rise optical signal and a first phase cancellation optical signal for obtaining the first differential current signal; and a second demodulator, which is used to perform phase rise and phase cancellation operations on the optical signal transmitted by its two arms and output a second phase rise optical signal and a second phase cancellation optical signal for obtaining the second differential current signal. In order to obtain the first differential current signal and the second differential current signal from which the modulation phase difference can be extracted and thereby accurately restore the transmitted information, it is required that the phase difference of the first demodulator must strictly meet the demodulation requirements: the phase difference is $\pi/4$, and that the phase difference of the two arms of the second demodulator must strictly meet the demodulation requirements: the phase difference is $-\pi/4$, otherwise, additional Optical Signal Noise Ratio price will be introduced.

In order to achieve monitoring and control of whether the phase difference between the two arms in the above demodulator meets the demodulation requirement, a feedback control loop is generally adopted to monitor the phase difference and generate a phase adjusting signal to adjust the phase difference between the two arms in the two modulators so that the phase difference meets the demodulation requirements (locked on the target values of $\pi/4$ and $-\pi/4$). Currently, the commonly used feedback control method is to implement slight disturbance with a fixed frequency of f and simultaneously monitor that the 2f component in the error signal reaches the extreme value. The intrinsic drawback of this solution is that phase disturbance with a fixed frequency of f will necessarily cause additional Optical Signal Noise Ratio price; the measurement of the extreme value only suggests whether the current phase is equal to the target value, but whether it is greater than or smaller than the target value is unknown; the rate of phase control is limited by the frequency of jitter; and the signal for which the extreme value is measured is in a square relationship with the phase error, and the control accuracy around the target value is relatively low.

SUMMARY OF THE INVENTION

The present invention provides a method and a device for monitoring and controlling a phase difference based on DQPSK modulation, which can monitor and control the phase difference more precisely and thereby restore the transmitted information accurately.

The present invention provides a method for monitoring a phase difference based on DQPSK modulation, comprising the following steps of:

performing a n$^{th}$ power multiplication operation respectively on a first differential current signal and a second differential current signal output after DQPSK demodulation so as to correspondingly obtain a first monitor signal and a second monitor signal, where, n is a positive integral multiple of 4;

monitoring a phase difference between two arms of a first demodulator according to the first monitor signal, wherein, the first demodulator is used to perform phase rise and phase cancellation operations on optical signals transmitted by the two arms thereof and output a first phase rise optical signal and a first phase cancellation optical signal for obtaining the first differential current signal;

monitoring a phase difference between two arms of a second demodulator according to the second monitor signal, wherein, the second demodulator is used to perform phase rise and phase cancellation operations on an optical signal transmitted by the two arms thereof and output a second phase rise optical signal and a second phase cancellation optical signal for obtaining the second differential current signal.

The present invention further provides a method for controlling a phase difference based on DQPSK modulation, comprising the following steps of:

monitoring the phase difference between two arms of the first demodulator and monitoring the phase difference between two arms of the second demodulator by the above method for monitoring a phase difference based on DQPSK modulation;

when the phase difference between the two arms of the first demodulator does not meet the demodulation requirement, adjusting an optical path difference between the two arms of the first demodulator to change the phase difference so that the phase difference between the two arms of the first demodulator meets the demodulation requirement;

when the phase difference between the two arms of the second demodulator does not meet the demodulation requirement, adjusting an optical path difference between the two arms of the second demodulator to change the phase difference so that the phase difference between the two arms of the second demodulator meets the demodulation requirement.

The present invention further provides a device for monitoring a phase difference based on DQPSK modulation, comprising:

a multiplier, which is used to perform a $n^{th}$ power multiplication operation respectively on a first differential current signal and a second differential current signal output after DQPSK demodulation so as to correspondingly obtain a first monitor signal and a second monitor signal, where, n is a positive integral multiple of 4;

a first monitoring unit, which is used to monitor a phase difference between two arms of a first demodulator according to the first monitor signal, wherein, the first demodulator is used to perform phase rise and phase cancellation operations on optical signals transmitted by the two arms thereof and output a first phase rise optical signal and a first phase cancellation optical signal for obtaining the first differential current signal;

a second monitoring unit, which is used to monitor a phase difference between two arms of a second demodulator according to the second monitor signal, wherein, the second demodulator is used to perform phase rise and phase cancellation operations on optical signals transmitted by the two arms thereof and output a second phase rise optical signal and a second phase cancellation optical signal for obtaining the second differential current signal.

The present invention further provides a device for controlling a phase difference based on DQPSK modulation, comprising:

the above device for monitoring a phase difference based on DQPSK modulation;

a first control unit, which is used to, according to a monitor result of the first monitoring unit, when the phase difference between the two arms of the first demodulator does not meet a demodulation requirement, adjust an optical path difference between the two arms of the first demodulator to change the phase difference so that the phase difference between the two arms of the first demodulator meets the demodulation requirement;

a second control unit, which is used to, according to a monitor result of the second monitoring unit, when the phase difference between the two arms of the second demodulator does not meet a demodulation requirement, adjust an optical path difference between the two arms of the second demodulator to change the phase difference so that the phase difference between the two arms of the second demodulator meets the demodulation requirement.

The present invention further provides a receiver based on DQPSK modulation, comprising:

a first demodulator, which is used to couple a received optical signal to two arms thereof to transmit, perform phase rise and phase cancellation operations on the optical signal transmitted by the two arms thereof and output a first phase rise optical signal and a first phase cancellation optical signal;

a second demodulator, which is used to couple a received optical signal to two arms thereof to transmit, perform phase rise and phase cancellation operations on the optical signal transmitted by the two arms thereof and output a second phase rise optical signal and a second phase cancellation optical signal;

a first balance receiver, which is used to obtain a first differential current signal according to the first phase rise optical signal and the first phase cancellation optical signal output by the first demodulator;

a second balance receiver, which is used to obtain a second differential current signal according to the second phase rise optical signal and the second phase cancellation optical signal output by the first demodulator;

the above device for controlling a phase difference based on DQPSK modulation;

a demodulating unit, which is used to obtain a modulation phase difference between adjacent optical bits according to the first differential current signal and the second differential current signal, and demodulate to obtain received information according to the modulation phase difference.

The present invention has the following beneficial effects: in the present invention, by means of $n^{th}$ power multiplication operation on the differential current, where n is a positive integer multiple of 4 (preferably n is 4), the error direction of the phase difference between the two arms in the demodulator is thereby determined according to the obtained first monitor signal and second monitor signal, which can avoid various problems existing in the method for monitoring a phase difference the prior art that, i.e., implementing slight disturbance with a fixed frequency of f and simultaneously monitoring that the 2f component in the error signal reaches the extreme value, and can monitor and control phase difference more precisely and thereby restore the transmitted information accurately.

SPECIFIC EMBODIMENTS

The method and device for monitoring and controlling a phase difference based on DQPSK modulation proposed by the present invention will be described below with reference to the drawings and examples.

Figure 2:
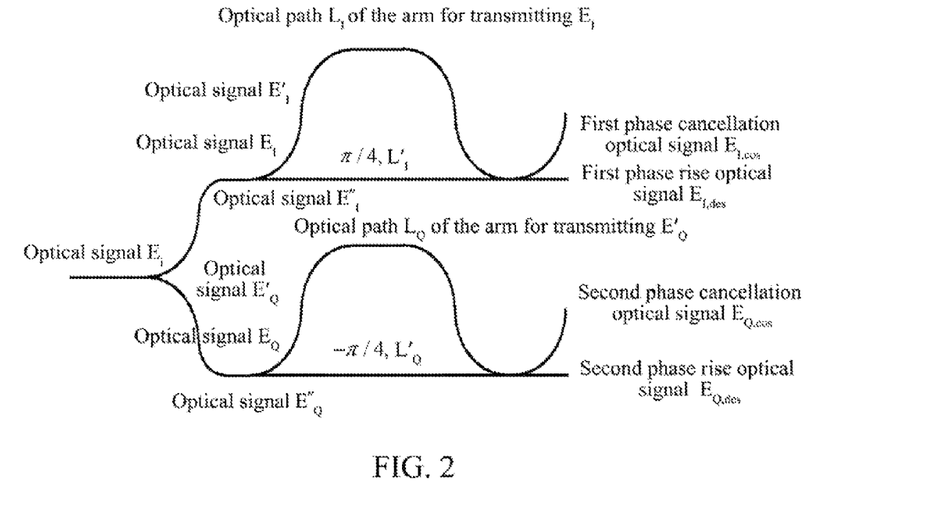
FIG. 2 is the flowchart of a DQPSK demodulation signal based on DQPSK modulation in a case of ideal phase difference.

Before providing the preferred examples of the present invention, the DQPSK demodulation process will be provided in conjunction with FIG. 1 and FIG. 2 to explain why the phase differences between the two arms of the first demodulator and the second demodulator must be strictly $\pi/4$ and $-\pi/4$. As shown in FIG. 1, the existing receiver comprises: a first demodulator, a second demodulator, a first balance receiver, a second balance receiver, a first demodulation control unit and a second demodulation control unit, where the first demodulation control unit is used to monitor and control the phase difference between the two arms in the first demodulator, and the second demodulation control unit is used to monitor and control the phase difference between the two arms in the second demodulator. As shown in FIG. 2, the optical signal after DQPSK modulation received by the receiver is divided by a first coupler (not shown) into two paths of optical signals $E_I$ and $E_Q$, which are input into a first modulator and a second modulator respectively. In the above $E_i = E \exp j[\omega_0 t + \phi(t)]$, E is the field strength, $\omega_0$ is the angular frequency of the optical carrier, $\phi(t)$ is the modulated phase. $E_I$ is divided by a second coupler (not shown) into two paths of optical signals $E'_I$ and $E'_{I'}$, which are input into two arms of the first demodulator to transmit respectively, and the first demodulator performs phase rise and phase cancellation operations on the optical signal transmitted by its two arms and outputs a first phase rise optical signal and a first phase cancellation optical signal for obtaining the first differential current signal. $E_Q$ is divided by a third coupler into two paths of optical signals $E'_Q$ and $E''_Q$, which are input into two arms of the second demodulator to transmit respectively, and the second demodulator performs phase rise and phase cancellation operations on the optical signal transmitted by its two arms and outputs a second phase rise optical signal and a second phase cancellation optical signal for obtaining the second differential current signal. The signals transmitted by the two arms of the first demodulator has a 1 Bit delay in the optical domain, and the signals transmitted by the two arms of the second demodulator has a 1 Bit delay in the optical domain. As shown in FIG. 2, the signal $E \exp j[\omega_0(t-t_{I',0})+\phi(t-t_{I',0})+\pi/4]$ after the $E''_I$ is transmitted through one arm of the first demodulator has a delay of 1 Bit in the optical domain with respect to the signal $E \exp j[\omega_0(t-t_{I,0})+\phi(t-t_{I,0})]$ after the $E'_I$ is transmitted through another arm of the first demodulator, and its phase is increased by $\pi/4$. The signal $E \exp j[\omega_0(t-t_{Q',0})+\phi(t-t_{Q',0})-\pi/4]$ obtained after the optical signal $E''_Q$ is transmitted on one arm of the second demodulator has a delay of 1 Bit in the optical domain with respect to the signal $E \exp j[\omega_0(t-t_{Q,0})+\phi(t-t_{Q,0})]$ obtained after the optical signal $E'_Q$ is transmitted on another arm, and its phase is decreased by $\pi/4$.

The first demodulator performs the following phase rise and phase cancellation operations on the optical signals transmitted by its two arms and obtains the first phase rise optical signal $E_{I,des}$ and the first phase cancellation optical signal $E_{I,cos}$ for obtaining the first differential current signal:

$$\begin{bmatrix} E_{I,cos} \\ E_{I,des} \end{bmatrix} = \frac{E}{2\sqrt{2}} \begin{bmatrix} \exp j[\omega_0(t-t_{I,0})+\varphi(t-t_{I,0})] - \exp j[\omega_0(t-t_{I',0})+\varphi(t-t_{I',0})+\frac{\pi}{4}] \\ j\exp j[\omega_0(t-t_{I,0})+\varphi(t-t_{I,0})] + j\exp j[\omega_0(t-t_{I',0})+\varphi(t-t_{I',0})+\frac{\pi}{4}] \end{bmatrix}$$

The second demodulator performs the following phase rise and phase cancellation operations on the optical signals transmitted by its two arms and obtains the second phase rise optical signal $E_{Q,des}$ and the second phase cancellation optical signal $E_{Q,cos}$ for obtaining the second differential current signal:

$$\begin{bmatrix} E_{Q,cos} \\ E_{Q,des} \end{bmatrix} = \frac{E}{2\sqrt{2}} \begin{bmatrix} \exp j[\omega_0(t-t_{Q,0})+\varphi(t-t_{Q,0})] - \exp j[\omega_0(t-t_{Q',0})+\varphi(t-t_{Q',0})-\frac{\pi}{4}] \\ j\exp j[\omega_0(t-t_{Q,0})+\varphi(t-t_{Q,0})] + j\exp j[\omega_0(t-t_{Q',0})+\varphi(t-t_{Q',0})-\frac{\pi}{4}] \end{bmatrix}$$

wherein, $L_I$ is the optical path of the arm for transmitting $E'_I$, $L'_I$ is the optical path of the arm for transmitting $E'_{I'}$, $t_{I,0}$ is the delay corresponding to the optical path $L_I$, $t_{I',0}$ is the delay corresponding to the optical path $L'_I$, $L_Q$ is the optical path of the arm for transmitting $E'_Q$, $L'_Q$ is the optical path of the arm for transmitting $E''_Q$, $t_{Q,0}$ is the delay corresponding to the optical path $L_Q$, $t_{Q',0}$ is the delay corresponding to the optical path $L'_Q$. For DQPSK modulation, the following equation is satisfied:

$$\varphi(t-t_{I',0}) - \varphi(t-t_{I,0}) = \varphi(t-t_{Q',0}) - \varphi(t-t_{Q,0}) = m\frac{\pi}{2}$$

$$m = 0, 1, 2, 3.$$

The first phase rise optical signal and the first phase cancellation optical signal output by the first demodulator are input to the first balance receiver comprising a first differential unit and a first photoelectric conversion unit, where the first differential unit is used to perform differential operation on the first phase rise optical signal and the first phase cancellation optical signal, and obtain through band-pass filtering:

$$|E_{I,des}|^2 - |E_{I,cos}|^2 = \frac{E^2}{2}\cos(m\frac{\pi}{2} + \frac{\pi}{4}), \text{ where,}$$

$$\begin{bmatrix} \left|\frac{E_{I,cos}}{E}\right|^2 \\ \left|\frac{E_{I,des}}{E}\right|^2 \end{bmatrix} = \frac{1}{4}\begin{bmatrix} 1 - \cos(m\frac{\pi}{2} + \frac{\pi}{4}) \\ 1 + \cos(m\frac{\pi}{2} + \frac{\pi}{4}) \end{bmatrix}$$

The second phase rise optical signal and the second phase cancellation optical signal output by the second demodulator are input to the second balance receiver comprising a second differential unit and a second photoelectric conversion unit, where the second differential unit is used to perform differential operation on the second phase rise optical signal and the second phase cancellation optical signal, and obtain through band-pass filtering:

$$|E_{Q,des}|^2 - |E_{Q,cos}|^2 = \frac{E^2}{2}\cos\left(m\frac{\pi}{2} - \frac{\pi}{4}\right), \text{ where,}$$

$$\begin{bmatrix} \left|\frac{E_{Q,cos}}{E}\right|^2 \\ \left|\frac{E_{Q,des}}{E}\right|^2 \end{bmatrix} = \frac{1}{4}\begin{bmatrix} 1 - \cos\left(m\frac{\pi}{2} - \frac{\pi}{4}\right) \\ 1 + \cos\left(m\frac{\pi}{2} - \frac{\pi}{4}\right) \end{bmatrix}$$

The first photoelectric conversion unit is used to perform photoelectric conversion on the optical signal obtained after the differential operation of the first differential unit to acquire a first differential current signal $i_I$, where the first differential current signal $i_I$ is directly proportional to $|E_{I,cos}|^2 - |E_{I,des}|^2$, and the second photoelectric conversion unit is used to perform photoelectric conversion on the optical signal obtained after the differential operation of the second differential unit to acquire a second differential current signal $i_Q$, where the second differential current signal $i_Q$ is directly proportional to $|E_{Q,cos}|^2 - |E_{Q,des}|^2$, that is, $$\begin{bmatrix} i_I \\ i_Q \end{bmatrix} \propto \begin{bmatrix} \cos\left(m\frac{\pi}{2} + \frac{\pi}{4}\right) \\ \cos\left(m\frac{\pi}{2} - \frac{\pi}{4}\right) \end{bmatrix}$$

Therefore, the first differential current signal and the second differential current signal can be used to obtain the modulation phase difference $m\pi/2$ between adjacent optical bits, thereby obtaining the transmitted information using the modulation phase difference, as shown in Table 1, in which the transmitted information is obtained using the modulation phase difference.

TABLE 1

| $m\frac{\pi}{2} = \theta(k) - \theta(k-1)$ | $\sqrt{2}\cos(\Phi_I + m\frac{\pi}{2})$ | $\sqrt{2}\cos(\Phi_Q + m\frac{\pi}{2})$ | Information | |
|---|---|---|---|---|
| 0 | 1 | 1 | 1 | 1 |
| $\pi/2$ | -1 | 1 | 0 | 1 |
| $\pi$ | -1 | -1 | 0 | 0 |
| $3\pi/2$ | 1 | -1 | 1 | 0 |

In Table 1, $\Phi_I$ is $\pi/4$, and $\Phi_Q$ is $-\pi/4$. So, it is demanded that the phase difference between the two arms of the two demodulators must be strictly meet the demodulation requirements: the phase difference is locked to the target values of $\pi/4$ and $-\pi/4$. However, generally the phase difference between the two arms of the first demodulator is not strictly $\pi/4$, i.e., there is an error optical path $\Delta L_I$, and the delay corresponding to the error optical path is $\Delta \tau_I$, thus causing the phase difference between the two arms to be not $\pi/4$ strictly. The phase difference between the two arms of the second demodulator is not strictly $-\pi/4$, i.e., there is an error optical path $\Delta L_Q$, and the delay corresponding to the error optical path is $\Delta \tau_Q$, thus causing the phase difference between the two arms to be not $-\pi/4$ strictly.

Figure 3:
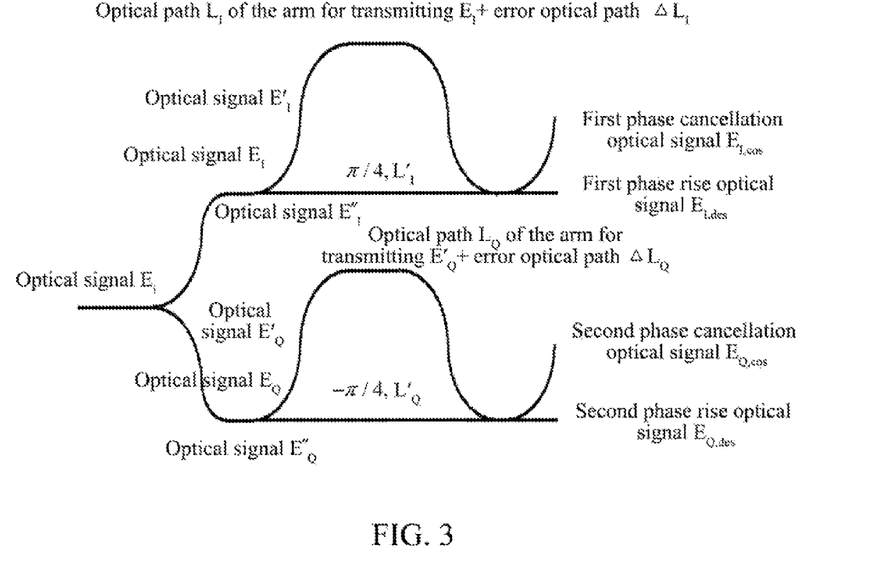
FIG. 3 is the flowchart of a DQPSK demodulation signal based on DQPSK modulation in the presence of phase error.

As shown in FIG. 3, in the presence of the above error optical paths of $\Delta L_I$ and $\Delta L_Q$, according to the previous DQPSK demodulation process, the first phase rise optical signal $E_{I,des}$ and the first phase cancellation optical signal $E_{I,cos}$ obtained after the first demodulator performs phase rise and phase cancellation operations on the optical signal transmitted by its two arms are:

$$\begin{bmatrix} E_{I,cos} \\ E_{I,des} \end{bmatrix} = \frac{E}{2\sqrt{2}} \begin{bmatrix} \exp j[\omega_0(t-t_{I,0}-\Delta\tau_I)+\varphi(t-t_{I,0}-\Delta\tau_I)] - \exp j[\omega_0(t-t_{I',0})+\varphi(t-t_{I',0})+\frac{\pi}{4}] \\ j\exp j[\omega_0(t-t_{I,0}-\Delta\tau_I)+\varphi(t-t_{I,0}-\Delta\tau_I)] + j\exp j[\omega_0(t-t_{I',0})+\varphi(t-t_{I',0})+\frac{\pi}{4}] \end{bmatrix}$$

The second phase rise optical signal $E_{Q,des}$ and the second phase cancellation optical signal $E_{Q,cos}$ obtained after the second demodulator performs phase rise and phase cancellation operations on the optical signal transmitted by its two arms are:

$$\begin{bmatrix} E_{Q,cos} \\ E_{Q,des} \end{bmatrix} = \frac{E}{2\sqrt{2}} \begin{bmatrix} \exp j[\omega_0(t-t_{Q,0}-\Delta\tau_Q)+\varphi(t-t_{Q,0}-\Delta\tau_Q)] - \exp j[\omega_0(t-t_{Q',0})+\varphi(t-t_{Q',0})-\frac{\pi}{4}] \\ j\exp j[\omega_0(t-t_{Q,0}-\Delta\tau_Q)+\varphi(t-t_{Q,0}-\Delta\tau_Q)] + j\exp j[\omega_0(t-t_{Q',0})+\varphi(t-t_{Q',0})-\frac{\pi}{4}] \end{bmatrix}$$

The first phase rise optical signal $E_{I,des}$ and the first phase cancellation optical signal $E_{I,cos}$ output by the first demodulator are input to the first differential unit of the first balance receiver for differential operation, and the signal obtained after band-pass filtering is:

$$|E_{I,des}|^2 - |E_{I,cos}|^2 = \frac{E^2}{2}\cos\left(\omega_0\Delta\tau_I + m\frac{\pi}{2} + \frac{\pi}{4}\right), \text{ where,}$$

$$\begin{bmatrix} \left|\frac{E_{I,cos}}{E}\right|^2 \\ \left|\frac{E_{I,des}}{E}\right|^2 \end{bmatrix} = \frac{1}{4}\begin{bmatrix} 1 - \cos\left(\omega_0\Delta\tau_I + m\frac{\pi}{2} + \frac{\pi}{4}\right) \\ 1 + \cos\left(\omega_0\Delta\tau_I + m\frac{\pi}{2} + \frac{\pi}{4}\right) \end{bmatrix}$$

The second phase rise optical signal $E_{Q,des}$ and the first phase cancellation optical signal $E_{Q,cos}$ output by the second demodulator are input to the second differential unit of the second balance receiver for differential operation, and the signal obtained after band-pass filtering is:

$$|E_{Q,des}|^2 - |E_{Q,cos}|^2 = \frac{E^2}{2}\cos(\omega_0\Delta\tau_Q + m\frac{\pi}{2} - \frac{\pi}{4}), \text{ where,}$$

$$\begin{bmatrix} \left|\frac{E_{Q,cos}}{E}\right|^2 \\ \left|\frac{E_{Q,des}}{E}\right|^2 \end{bmatrix} = \frac{1}{4}\begin{bmatrix} 1 - \cos(\omega_0\Delta\tau_Q + m\frac{\pi}{2} - \frac{\pi}{4}) \\ 1 + \cos(\omega_0\Delta\tau_Q + m\frac{\pi}{2} - \frac{\pi}{4}) \end{bmatrix} \quad (5)$$

Likewise, the first differential current signal $i_I$ obtained after the first photoelectric conversion unit performs photoelectric conversion on the optical signal obtained after the differential operation of the first differential unit is directly proportional to $|E_{I,cos}|^2 - |E_{I,des}|^2$, and the second differential current signal $i_Q$ obtained after the second photoelectric conversion unit performs photoelectric conversion on the optical signal obtained after the differential operation of the second differential unit is directly proportional to $|E_{Q,cos}|^2 - |E_{Q,des}|^2$, which are represented by the formula (1):

$$\begin{bmatrix} i_I \\ i_Q \end{bmatrix} \propto \begin{bmatrix} \cos(\omega_0\Delta\tau_I + m\frac{\pi}{2} + \frac{\pi}{4}) \\ \cos(\omega_0\Delta\tau_Q + m\frac{\pi}{2} - \frac{\pi}{4}) \end{bmatrix} \quad (1)$$

As can be seen, the modulation relationship shown in Table 1 can be used only in the case where the above error optical paths $\Delta L_I$ and $\Delta L_Q$ are made to be 0 through modulation, i.e., in the case where $\omega_0\Delta\tau_I = \omega_0\Delta\tau_Q = 0$, and in the absence of additional Optical Signal Noise Ratio price, the differential current is demodulated to obtain the modulation phase difference and to thereby obtain the transmitted information. In order to modulate the above error optical path $\Delta L_I$ and the error optical path $\Delta L_Q$ to be 0 so that the phase differences in the first demodulator and the second demodulator meet the demodulation requirements, it needs to monitor and control the phase difference. The method for monitoring a phase difference based on DQPSK modulation provided in the present invention comprises: performing a $n^{th}$ power multiplication operation respectively on a first differential current signal and a second differential current signal output after DQPSK demodulation so as to correspondingly obtain a first monitor signal and a second monitor signal, where, n is a positive integral multiple of 4; monitoring a phase difference between two arms of a first demodulator according to the first monitor signal, where whether the phase difference is locked to the target value of $\pi/4$ can be monitored, the first demodulator is used to perform phase rise and phase cancellation operations on optical signals transmitted by the two arms thereof and output a first phase rise optical signal and a first phase cancellation optical signal for obtaining the first differential current signal; monitoring a phase difference between two arms of a second demodulator according to the second monitor signal, where whether the phase difference is locked to the target value of $-\pi/4$ can be monitored, the second demodulator is used to perform phase rise and phase cancellation operations on an optical signal transmitted by the two arms thereof and output a second phase rise optical signal and a second phase cancellation optical signal for obtaining the second differential current signal.

In the present invention, without changing the original DQPSK demodulation process, $n^{th}$ power multiplication operation is performed on the output first differential current signal and the second differential current signal, and the signal obtained after the multiplication operation is taken as the monitor signal. According to the above deduced formula (1), a formula (2) can be obtained after the above multiplication operation:

$$\begin{bmatrix} i_I^n \\ i_Q^n \end{bmatrix} \propto \begin{bmatrix} \cos(n\omega_0\Delta\tau_I + mn\frac{\pi}{2} + n\frac{\pi}{4}) \\ \cos(n\omega_0\Delta\tau_Q + nm\frac{\pi}{2} - n\frac{\pi}{4}) \end{bmatrix} \quad (2)$$

If n is a positive odd multiple of 4, and $\omega_0\Delta\tau_I = \omega_0\Delta\tau_Q = 0$, the first monitor signal and the second monitor signal reach the minimum values. Therefore, when the first monitor signal reaches the minimum value, it is judged that the phase difference between the two arms of the first demodulator meets the demodulation requirement; when the second monitor signal reaches the minimum value, it is judged that the phase difference between the two arms of the second demodulator meets the demodulation requirement.

If n is a positive even multiple of 4, and $\omega_0\Delta\tau_I \omega_0\Delta\tau_Q = 0$, the first monitor signal and the second monitor signal reach the maximum values. Therefore, when the first monitor signal reaches the maximum value, it is judged that the phase difference between the two arms of the first demodulator meets the demodulation requirement; when the second monitor signal reaches the maximum value, it is judged that the phase difference between the two arms of the second demodulator meets the demodulation requirement. In order to decrease the burden of the multiplier and provide the multiplication operation rate, n is 4 in this example. The following formula (3) can be obtained after performing fourth power multiplication operation on the first differential current signal and the second differential current signal:

$$\begin{bmatrix} i_I^4 \\ i_Q^4 \end{bmatrix} \propto \begin{bmatrix} \cos(4\omega_0\Delta\tau_I + 2m\pi + \pi) \\ \cos(4\omega_0\Delta\tau_Q + 2m\pi - \pi) \end{bmatrix} \quad (3)$$

Such, when the phase differences between the two arms of the two modulators on the optical path are not $\pi/4$, $-\pi/4$, that is, when $\omega_0\Delta\tau_I = \omega_0\Delta\tau_Q \neq 0$, $i_I^4$, $i_Q^4$ are not at the minimum values, and this feedback signal can be used to adjust the phase differences of the two arms of the DQPSK demodulators to $\pi/4$ and $-\pi/4$.

Figure 4:
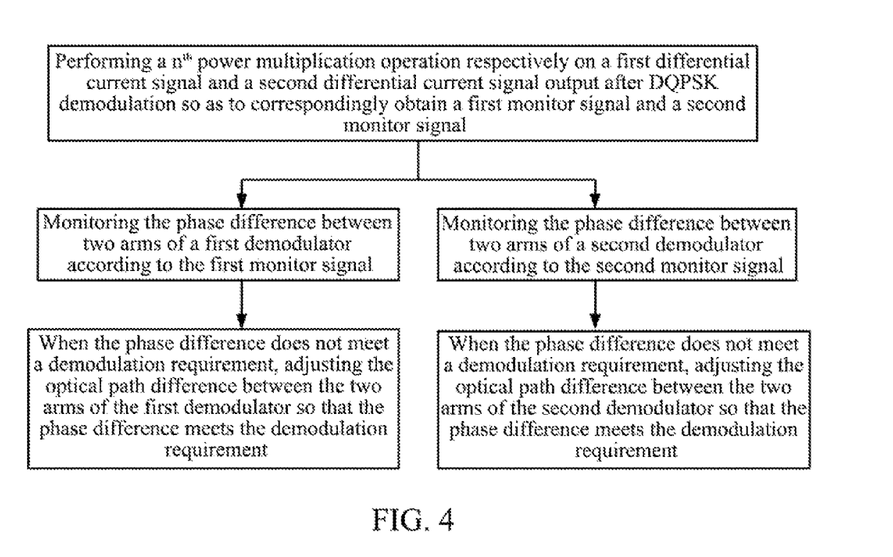
FIG. 4 is the flowchart of the method for phase control based on DQPSK modulation according to an example of the present invention.

Based on the above method for monitoring a phase difference based on DQPSK modulation that is proposed above, this example provides a method for controlling a phase difference based on DQPSK modulation, which, as shown in FIG. 4, comprising: monitoring a phase difference between two arms of a first demodulator and monitoring a phase difference between two arms of a second demodulator by the above method; when the phase difference between the two arms of the first demodulator does not meet a demodulation requirement, adjusting an optical path difference between the two arms of the first demodulator to change the phase difference so that the phase difference between the two arms of the first demodulator meets the demodulation requirement; when the phase difference between the two arms of the second demodulator does not meet a demodulation requirement, adjusting an optical path difference between the two arms of the second demodulator to change the phase difference so that the phase difference between the two arms of the second demodulator meets the demodulation requirement. In this example, the temperatures of the two arms of the first demodulator and the second demodulator are adjusted by a temperature control circuit to adjust the optical path difference of the two arms in the first demodulator and the optical path difference of the two arms in the second demodulator so as to make them meet the requirement of reaching the phase differences of $\pi/4$ and $-\pi/4$.

Figure 5:
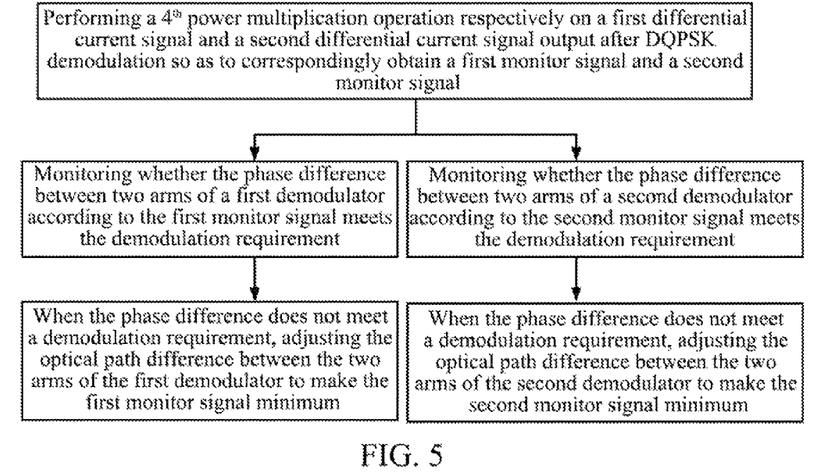
FIG. 5 is the flowchart of the method for phase control based on DQPSK modulation when 4th power multiplication operation is performed according to an example of the present invention.

When n is a positive odd multiple of 4, for example when n is 4, as shown in FIG. 5, the method for controlling a phase difference based on DQPSK modulation comprises the steps of: monitoring a phase difference between two arms of a first demodulator and monitoring a phase difference between two arms of a second demodulator by the above method for monitoring a phase difference based on DQPSK modulation; when the phase difference between the two arms of the first demodulator does not meet a demodulation requirement, adjusting an optical path difference between the two arms of the first demodulator so that the first monitor signal reaches the minimum value; when the phase difference between the two arms of the second demodulator does not meet a demodulation requirement, adjusting an optical path difference between the two arms of the second demodulator so that the second monitor signal reaches the minimum value; when the n is a positive even multiple of 4, when the phase difference between the two arms of the first demodulator does not meet a demodulation requirement, adjusting an optical path difference between the two arms of the first demodulator so that the first monitor signal reaches the maximum value; when the phase difference between the two arms of the second demodulator does not meet a demodulation requirement, adjusting an optical path difference between the two arms of the second demodulator so that the second monitor signal reaches the maximum value.

According to the example two of the present invention, a device for monitoring a phase difference based on DQPSK modulation is provided, wherein, the device comprises: a multiplier, which is used to perform a $n^{th}$ power multiplication operation respectively on a first differential current signal and a second differential current signal output after DQPSK demodulation so as to correspondingly obtain a first monitor signal and a second monitor signal, where, n is a positive integral multiple of 4; a first monitoring unit, which is used to monitor a phase difference between two arms of a first demodulator according to the first monitor signal, wherein, the first demodulator is used to perform phase rise and phase cancellation operations on optical signals transmitted by the two arms thereof and output a first phase rise optical signal and a first phase cancellation optical signal for obtaining the first differential current signal; a second monitoring unit, which is used to monitor a phase difference between two arms of a second demodulator according to the second monitor signal, wherein, the second demodulator is used to perform phase rise and phase cancellation operations on an optical signal transmitted by the two arms thereof and output a second phase rise optical signal and a second phase cancellation optical signal for obtaining the second differential current signal. When n is a positive odd multiple of 4, the first monitoring unit is used to determine that the phase difference between the two arms of the first demodulator meets the demodulation requirement when the first monitor signal reaches the minimum value; the second monitoring unit is used to determine that the phase difference between the two arms of the second demodulator meets the demodulation requirement when the second monitor signal reaches the minimum value; when n is a positive even multiple of 4, the first monitoring unit is used to determine that the phase difference between the two arms of the first demodulator meets the demodulation requirement when the first monitor signal reaches the maximum value; the second monitoring unit is used to determine that the phase difference between the two arms of the second demodulator meets the demodulation requirement when the second monitor signal reaches the maximum value.

This example further provides a device for controlling a phase difference based on DQPSK modulation, comprising: the above device for monitoring a phase difference based on DQPSK modulation; a first control unit, which is used to, according to a monitor result of the first monitoring unit, when the phase difference between the two arms of the first demodulator does not meet a demodulation requirement, adjust an optical path difference between the two arms of the first demodulator to change the phase difference so that the phase difference between the two arms of the first demodulator meets the demodulation requirement; a second control unit, which is used to, according to a monitor result of the second monitoring unit, when the phase difference between the two arms of the second demodulator does not meet a demodulation requirement, adjust an optical path difference between the two arms of the second demodulator to change the phase difference so that the phase difference between the two arms of the second demodulator meets the demodulation requirement.

Figure 6:
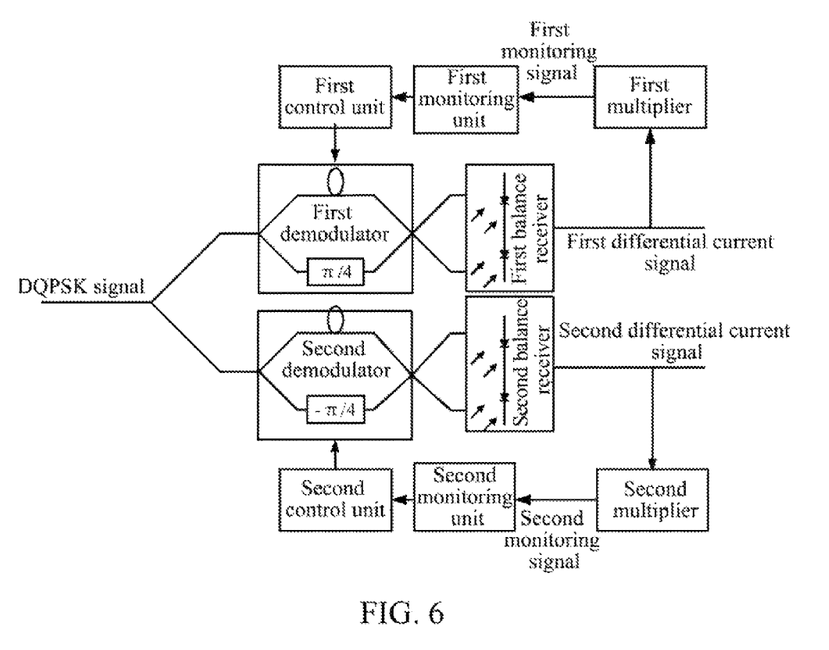
FIG. 6 is the block diagram of the receiver based on DQPSK modulation according to an example of the present invention.

Based on the above device for phase difference control, this example provides a receiver based on DQPSK modulation, which, as shown in FIG. 6, comprises: a first demodulator, a second demodulator, a first balance receiver comprising a first differential unit and a first photoelectric conversion unit, a second balance receiver comprising a second differential unit and a second photoelectric conversion unit, a first multiplier, a second multiplier, a first monitoring unit, a second monitoring unit, a first control unit and a second control unit.
Wherein:

the first demodulator is used to couple a received optical signal to two arms thereof to transmit, perform phase rise and phase cancellation operations on the optical signal transmitted by the two arms thereof and output a first phase rise optical signal and a first phase cancellation optical signal; the processes of the phase rise and phase cancellation operations are as described above and will not be repeated here;

the second demodulator is used to couple a received optical signal to two arms thereof to transmit, perform phase rise and phase cancellation operations on the optical signal transmitted by the two arms thereof and output a second phase rise optical signal and a second phase cancellation optical signal; the processes of the phase rise and phase cancellation operations are as described above and will not be repeated here;

the first differential unit is used to perform differential operation according to the first phase rise optical signal and the first phase cancellation optical signal output by the first demodulator and then perform band-pass filtering to obtain the optical signal after the differential operation, the process of which is the same as described above;

the first photoelectric conversion unit is used to perform photoelectric conversion on the optical signal obtained by the first differential unit to obtain the first differential current signal;

the second differential unit is used to perform differential operation according to the second phase rise optical signal and the second phase cancellation optical signal output by the second demodulator and then perform band-pass filtering to obtain the optical signal after the differential operation, the process of which is the same as described above;

the second photoelectric conversion unit is used to perform photoelectric conversion on the optical signal obtained by the second differential unit to obtain the second differential current signal;

the first multiplier is used to perform $n^{th}$ power multiplication operation on the first differential current signal output through DQPSK demodulation to correspondingly obtain the first monitor signal, where n is a positive integer multiple of 4;

the second multiplier is used to perform $n^{th}$ power multiplication operation on the second differential current signal output through DQPSK demodulation to correspondingly obtain the second monitor signal, where n is a positive integer multiple of 4;

the first monitoring unit is used to monitor according to the first monitor unit and judge the phase difference between the two arms of the first demodulator;

the second monitoring unit is used to monitor according to the second monitor unit and judge the phase difference between the two arms of the second demodulator;

the first control unit is used to, according to a monitor result of the first monitoring unit, when the phase difference between the two arms of the first demodulator does not meet a demodulation requirement, adjust an optical path difference between the two arms of the first demodulator to change the phase difference so that the phase difference between the two arms of the first demodulator meets the demodulation requirement; as for the way of changing the optical path, the method of changing the optical path by adjusting the temperatures of the two arms through a temperature control circuit is preferably adopted, and of course, other methods can also be adopted;

a second control unit is used to, according to a monitor result of the second monitoring unit, when the phase difference between the two arms of the second demodulator does not meet a demodulation requirement, adjust an optical path difference between the two arms of the second demodulator to change the phase difference so that the phase difference between the two arms of the second demodulator meets the demodulation requirement; as for the way of changing the optical path, the method of changing the optical path by adjusting the temperatures of the two arms through a temperature control circuit is preferably adopted, and of course, other methods can also be adopted. It is preferably that only the optical path of one of the two arms is changed to adjust the optical path difference between the two arms.

A demodulating unit (not shown) is used to obtain the modulation phase difference between adjacent optical bits according to the first differential current signal and the second differential current signal, and demodulate to obtain the received information according to the modulation phase difference.

The transmission paths of the first monitor signal and the second monitor signal in the above receiver should keep the equal so as to avoid additional phase error.

Obviously, a person having ordinary skill in the art can make various modifications and transformations to the present invention without departing from the spirit and scope of the present invention. Such, if these modifications and transformations made to the present invention fall into the scope of the claims of the present invention and equivalent technology thereof, the present invention is also intended to include these modifications and transformations.

What is claimed is:

1. A method for monitoring a phase difference based on DQPSK (Differential Quadrature Reference Phase Shift Keying) modulation, comprising the following steps of:

performing a $n^{th}$ power multiplication operation respectively on a first differential current signal and a second differential current signal output after DQPSK demodulation so as to correspondingly obtain a first monitor signal and a second monitor signal, where, n is a positive integral multiple of 4;

monitoring a phase difference between two arms of a first demodulator according to the first monitor signal, wherein, the first demodulator is used to perform phase rise and phase cancellation operations on optical signals transmitted by the two arms thereof and output a first phase rise optical signal and a first phase cancellation optical signal for obtaining the first differential current signal;

monitoring a phase difference between two arms of a second demodulator according to the second monitor signal, wherein, the second demodulator is used to perform phase rise and phase cancellation operations on optical signals transmitted by the two arms thereof and output a second phase rise optical signal and a second phase cancellation optical signal for obtaining the second differential current signal.

2. The method according to claim 1, wherein, when the n is a positive odd multiple of 4, it is determined that the phase difference between the two arms of the first demodulator meets a demodulation requirement when the first monitor signal reaches a minimum value, and it is determined that the phase difference between the two arms of the second demodulator meets a demodulation requirement when the second monitor signal reaches a minimum value;

when the n is a positive even multiple of 4, it is determined that the phase difference between the two arms of the first demodulator meets the demodulation requirement when the first monitor signal reaches a maximum value, and it is determined that the phase difference between the two arms of the second demodulator meets the demodulation requirement when the second monitor signal reaches a maximum value.

3. The method according to claim 1, wherein, the n is 4.

4. The method according to claim 1, wherein, the method further comprises:

when the phase difference between the two arms of the first demodulator does not meet the demodulation requirement, adjusting an optical path difference between the two arms of the first demodulator to change the phase difference so that the phase difference between the two arms of the first demodulator meets the demodulation requirement;

when the phase difference between the two arms of the second demodulator does not meet the demodulation requirement, adjusting an optical path difference between the two arms of the second demodulator to change the phase difference so that the phase difference between the two arms of the second demodulator meets the demodulation requirement.

5. The method according to claim 4, wherein, when the n is positive odd multiple of 4, the optical path difference between the two arms of the first demodulator is adjusted so that the first monitor signal reaches the minimum value, and the optical path difference between the two arms of the second demodulator is adjusted so that the second monitor signal reaches the minimum value;

when the n is a positive even multiple of 4, the optical path difference between the two arms of the first demodulator is adjusted so that the first monitor signal reaches the maximum value, and the optical path difference between the two arms of the second demodulator is adjusted so that the second monitor signal reaches the maximum value.

6. The method according to claim 4, wherein, temperatures of the two arms in the first demodulator and the two arms in the second demodulator are adjusted respectively through a temperature control circuit to correspondingly adjust the optical path difference between the two arms in the first demodulator and the optical path difference between the two arms in the second demodulator;

the demodulation requirement is met when the phase difference between the two arms in the first demodulator is $\pi/4$;

the demodulation requirement is met when the phase difference between the two arms in the second demodulator is $-\pi/4$.

7. A device for monitoring a phase difference based on DQPSK (Differential Quadrature Reference Phase Shift Keying) modulation, comprising:

a multiplier, which is used to perform a $n^{th}$ power multiplication operation respectively on a first differential current signal and a second differential current signal output after DQPSK demodulation so as to correspondingly obtain a first monitor signal and a second monitor signal, where, n is a positive integral multiple of 4;

a first monitoring unit, which is used to monitor a phase difference between two arms of a first demodulator according to the first monitor signal, wherein, the first demodulator is used to perform phase rise and phase cancellation operations on optical signals transmitted by the two arms thereof and output a first phase rise optical signal and a first phase cancellation optical signal for obtaining the first differential current signal;

a second monitoring unit, which is used to monitor a phase difference between two arms of a second demodulator according to the second monitor signal, wherein, the second demodulator is used to perform phase rise and phase cancellation operations on optical signals transmitted by the two arms thereof and output a second phase rise optical signal and a second phase cancellation optical signal for obtaining the second differential current signal.

8. The device according to claim 7, wherein, when the n is a positive odd multiple of 4, the first monitoring unit is used to determine that the phase difference between the two arms of the first demodulator meets the demodulation requirement when the first monitor signal reaches a minimum value; the second monitoring unit is used to determine that the phase difference between the two arms of the second demodulator meets the demodulation requirement when the second monitor signal reaches a minimum value;

when the n is a positive even multiple of 4, the first monitoring unit is used to determine that the phase difference between the two arms of the first demodulator meets the demodulation requirement when the first monitor signal reaches a maximum value; the second monitoring unit is used to determine that the phase difference between the two arms of the second demodulator meets the demodulation requirement when the second monitor signal reaches a maximum value.

9. The device according to claim 7, wherein, the device further comprises:

a first control unit, which is used to, according to a monitor result of the first monitoring unit, when the phase difference between the two arms of the first demodulator does not meet the demodulation requirement, adjust an optical path difference between the two arms of the first demodulator to change the phase difference so that the phase difference between the two arms of the first demodulator meets the demodulation requirement;

a second control unit, which is used to, according to a monitor result of the second monitoring unit, when the phase difference between the two arms of the second demodulator does not meet the demodulation requirement, adjust an optical path difference between the two arms of the second demodulator to change the phase difference so that the phase difference between the two arms of the second demodulator meets the demodulation requirement.

10. A receiver based on DQPSK modulation, comprising:

a first demodulator, which is used to couple a received optical signal to two arms thereof to transmit, perform phase rise and phase cancellation operations on the optical signal transmitted by the two arms thereof and output a first phase rise optical signal and a first phase cancellation optical signal;

a second demodulator, which is used to couple a received optical signal to two arms thereof to transmit, perform phase rise and phase cancellation operations on the optical signal transmitted by the two arms thereof and output a second phase rise optical signal and a second phase cancellation optical signal;

a first balance receiver, which is used to obtain a first differential current signal according to the first phase rise optical signal and the first phase cancellation optical signal output by the first demodulator;

a second balance receiver, which is used to obtain a second differential current signal according to the second phase rise optical signal and the second phase cancellation optical signal output by the first demodulator;

the device for controlling a phase difference based on DQPSK (Differential Quadrature Reference Phase Shift Keying) modulation as described in claim 9;

a demodulating unit, which is used to obtain a modulation phase difference between adjacent optical bits according to the first differential current signal and the second differential current signal, and demodulate to obtain received information according to the modulation phase difference.

11. The method according to claim 2, wherein, the n is 4.

12. The method according to claim 5, wherein, temperatures of the two arms in the first demodulator and the two arms in the second demodulator are adjusted respectively through a temperature control circuit to correspondingly adjust the optical path difference between the two arms in the first demodulator and the optical path difference between the two arms in the second demodulator;

the demodulation requirement is met when the phase difference between the two arms in the first demodulator is $\pi/4$;

the demodulation requirement is met when the phase difference between the two arms in the second demodulator is $-\pi/4$.

* * * * *